US011228502B2

(12) United States Patent
Horvat

(10) Patent No.: US 11,228,502 B2
(45) Date of Patent: Jan. 18, 2022

(54) AGGREGATION PLATFORM, REQUIREMENT OWNER, AND METHODS THEREOF

(71) Applicant: HUAWEI TECHNOLOGIES CO., LTD., Guangdong (CN)

(72) Inventor: Attila Horvat, Kista (SE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/509,918

(22) Filed: Jul. 12, 2019

(65) Prior Publication Data

US 2019/0379585 A1 Dec. 12, 2019

Related U.S. Application Data

(63) Continuation of application No. PCT/EP2017/050710, filed on Jan. 13, 2017.

(51) Int. Cl.
*H04L 12/24* (2006.01)
*H04W 84/04* (2009.01)

(52) U.S. Cl.
CPC ......... *H04L 41/145* (2013.01); *H04W 84/042* (2013.01)

(58) Field of Classification Search
CPC ................ H04L 41/145; H04W 84/042; G06F 17/30598; G06F 17/30528
USPC ......................................................... 370/254
See application file for complete search history.

(56) References Cited

U.S. PATENT DOCUMENTS

| 9,336,239 B1* | 5/2016 | Hoffmann ................ G06K 9/62 |
| 2010/0023952 A1* | 1/2010 | Sandoval ............. G06F 16/258 719/318 |
| 2011/0227754 A1* | 9/2011 | Hill ....................... G06F 16/244 340/870.01 |
| 2016/0212017 A1* | 7/2016 | Li .......................... H04L 41/12 |

(Continued)

FOREIGN PATENT DOCUMENTS

| CN | 104270428 A | 1/2015 |
| CN | 104915909 A | 9/2015 |
| WO | 2016192794 A1 | 12/2016 |

OTHER PUBLICATIONS

ETSI GS NFV-INF 010 V1.1.1,Network Functions Virtualisation (NFV);Service Quality Metrics, Dec. 2014, 27 pages.

(Continued)

*Primary Examiner* — Hassan Kizou
*Assistant Examiner* — Abdullahi Ahmed
(74) *Attorney, Agent, or Firm* — Fish & Richardson P.C.

(57) ABSTRACT

The present disclosure relates to aggregation platforms and requirement owners. One example aggregation platform is configured to receive a request from a requirement owner, where the received request comprises a request for an aggregation platform data model (APDM); determine an APDM based on the received request, where the determined APDM comprises at least one relationship between at least one model and at least one associated model repository, transmit the determined APDM to the requirement owner, receive an aggregation requirement (AR) from the requirement owner, where the received AR comprises at least one model identifier and at least one associated model repository identifier, and generate a deployment template (DP) based on the received AR.

20 Claims, 17 Drawing Sheets

(56) References Cited

U.S. PATENT DOCUMENTS

2017/0053015 A1* 2/2017 Liongosari ............ G06F 16/113
2017/0134218 A1* 5/2017 Zhao ................... H04L 12/4641
2019/0050248 A1* 2/2019 Oohira ................. G06F 9/5044
2020/0259719 A1* 8/2020 Ni ........................... H04L 41/20

OTHER PUBLICATIONS

Thurner,"Implementing the Executable Conceptual Model (ECM)", Rebweg 21, CH8700, Kusnacht, Switzerland, 6 pages.
Willumsen,"Executable Conceptual Models in Information Systems Engineering", Information Systems Group, Nov. 1993, 317 pages.
Wikipedia Contributor,"Data mapping",created on May 9, 2005, [Retrieved on Oct. 14, 2019], retrieved from: URL <https://en.wikipedia.org/wiki/Data_mapping#Data-driven_mapping>, 3 pages.
IEEE Std 802.1AX™—2008,IEEE Standard for Local and metropolitan area networks—Link Aggregation,IEEE Computer Society, Sep. 26, 2008, 163 pages.
PCT International Search Report and Written Opinion in International Application No. PCT/EP2017/050,710, dated Mar. 21, 2017, 11 pages.
Office Action issued in Chinese Application No. 201780075632.6 dated Dec. 23, 2020, 13 pages.
Office Action issued in Chinese Application No. 201780075632.6 dated Jun. 17, 2021, 4 pages.

* cited by examiner

AGGREGATION PLATFORM, REQUIREMENT OWNER, AND METHODS THEREOF

CROSS-REFERENCE TO RELATED APPLICATIONS

This application is a continuation of International Application No. PCT/EP2017/050710, filed on Jan. 13, 2017, the disclosure of which is hereby incorporated by reference in its entirety.

TECHNICAL FIELD

The invention relates to an aggregation platform and a requirement owner. Furthermore, the invention also relates to corresponding methods, a computer program, and a computer program product.

BACKGROUND

The future 5G communication networks and systems promise flexibility built on automation, virtualization, and programmability. These values are especially important for supporting anticipated 5G dedicated logical networks and a new generation of 5G management systems based on European Telecommunications Standard Institute (ETSI) Network Function Virtualization (NFV) standard. While virtualization and programmability delivers some level of flexibility, these new technologies do not address the dynamic Network Function (NF) customization needed to promote operator 5G innovation capability and shorten time-to-market for 5G services.

In 5G, network nodes which comprises of NFs are expected to be deployed as standalone ETSI Virtual Network Functions (VNFs) that represent chained components of ETSI VNF Components (VNFCs) or ETSI Virtual Deployment Units (VDUs). From software architecture point of view, these software images are part of vendor software product packaging that represents standardized and non-standardized software components (such as VNFCs and VDUs). These vendor software product packaging inherited more or less the structure of traditional telecommunication physical appliances, where software flexibility is limited with specific hardware requirements for guaranteed scalability, guaranteed performance, etc. The operators are constrained to these vendor products with hardcoded subsystem dependencies and pre-defined service and component chaining. Hence, the needed dynamic NF customization is not addressed. As a result, the operators 5G innovation capability is reduced and the time-to-market for 5G services will not improve significantly.

In a conventional NFV Network Service (NS) deployment process an interpreter must first map various high level requirements into multi-vendor repository of NFs and then map those matched multi-vendor NFs into intermediate form of requirements that can be executed (i.e. NFV descriptors or templates). When these mappings are done, provided NFV descriptors are executed by ETSI NFV Management and Orchestration (MANO).

The requirement mapping between high level requirement, Network Function repository, intermediate form of requirements and NFV descriptors are very complex, static and very often involve vendors providing these time consuming mappings. After these mappings are done, NFV descriptors are created based on pre-defined vendor product constraints that include the hardcoded VNF structure, VNFC number and VNFC chaining and VNF/VNFC resource requirements in general. This process should be shorter, automated, and agile.

SUMMARY

An objective of embodiments of the invention is to provide a solution which mitigates or solves the drawbacks and problems of conventional solutions.

Another objective of embodiments of the invention is to provide a solution which provides an improved NFV Network Service deployment process.

The above and further objectives are solved by the subject matter of the independent claims. Further advantageous implementation forms of the invention can be found in the dependent claims.

According to a first aspect of the invention, the above mentioned and other objectives are achieved with an aggregation platform for a communication system, the aggregation platform being configured to
- receive a request from a requirement owner, wherein the received request comprises a request for an aggregation platform data model;
- determine an aggregation platform data model based on the received request, wherein the determined aggregation platform data model comprises at least one relationship between at least one model and at least one associated model repository;
- transmit the determined aggregation platform data model to the requirement owner;
- receive an aggregation requirement from the requirement owner, wherein the received aggregation requirement comprises at least one model identifier and at least one associated model repository identifier;
- generate a deployment template based on the received aggregation requirement.

The aggregation platform according to the first aspect provides a number of advantages over conventional solutions. One such advantage is that the aggregation platform according to the first aspect eliminates multiple time consuming and non-automated mappings before NFV network service deployment.

In a first possible implementation form of an aggregation platform according to the first aspect, the model identifier of the received aggregation requirement comprises a function model identifier, an algorithm model identifier, and a sorting criteria model identifier.

The first implementation form defines a minimum set of data that represents any aggregation requirement towards the aggregation platform.

In a second possible implementation form of an aggregation platform according to the first implementation form of the first aspect or to the first aspect as such, the associated model repository identifier of the received aggregation requirement comprises a function model repository identifier, an algorithm model repository identifier, and a sorting criteria model repository identifier.

The second implementation form defines an additional set of data that represents any aggregation requirement towards the aggregation platform.

In a third possible implementation form of an aggregation platform according to the second implementation form of the first aspect, the aggregation platform is further configured to
- match the received model identifier and the associated model repository identifier of the aggregation requirement to the model and to the associated model repository so as to obtain at least one matched model;
determine at least one function model and at least one sorting criteria model based on the matched model;
sort the determined function model based on the determined sorting criteria model so as to obtain a sorted function model;
apply at least one algorithm on the sorted function model based on the algorithm model repository identifier so as to generate the deployment template.

The third implementation form offers automated aggregation that follows the aggregation requirement.

In a fourth possible implementation form of an aggregation platform according to any of the preceding implementation forms of the first aspect or to the first aspect as such, the determined aggregation platform data model further comprises a description of the model, at least one attribute of the model, at least one description of the model repository, and at least one attribute of the model repository.

The fourth implementation form defines the aggregation platform data model content that is used to customize the aggregation platform and to generate an aggregation requirement.

In a fifth possible implementation form of an aggregation platform according to any of the preceding implementation forms of the first aspect or to the first aspect as such, the aggregation platform is further configured to
transmit the deployment template to a deployment platform.

The fifth implementation form enables the aggregation platform to transmit the deployment template to the deployment platform.

In a sixth possible implementation form of an aggregation platform according to any of the preceding implementation forms of the first aspect or to the first aspect as such, the aggregation platform is further configured to
receive an updated aggregation requirement from the requirement owner;
determine an updated deployment template based on the updated aggregation requirement;
transmit the updated deployment template to the deployment platform.

In the sixth implementation form the aggregation platform offers runtime life-cycle-management capability to the deployment platform.

In a seventh possible implementation form of an aggregation platform according to the fifth or sixth implementation form of the first aspect, the aggregation platform is further configured to
receive a matched deployment template from the deployment platform;
decouple the received matched deployment template into at least one of a function model, a sorting criteria model, and an algorithm model so as to obtain at least one of a decoupled function model, a decoupled sorting criteria model, and a decoupled algorithm model;
store at least one of the decoupled function model, the decoupled sorting criteria model, and the decoupled algorithm model into the associated model repositories.

In the seventh implementation form the aggregation platform offers runtime decupling capability to the deployment platform.

In an eighth possible implementation form of an aggregation platform according to any of the preceding implementation forms of the first aspect or to the first aspect as such, the aggregation platform is further configured to
receive an extension request from an extension owner, wherein the extension request comprises a request for an aggregation platform extension data model;
determine an aggregation platform extension data model based on the extension request;
transmit the determined aggregation platform extension data model to the extension owner.

In the eighth implementation form the aggregation platform offers data model extension capability exposure.

In a ninth possible implementation form of an aggregation platform according to the eighth implementation form of the first aspect, the aggregation platform is further configured to
receive at least one model extension from the extension owner, wherein the model extension comprises at least one model identifier and at least one associated model repository identifier;
extend the aggregation platform data model based on the received model extension so as to obtain an extended aggregation platform data model;

The extended aggregation platform data model may be transmitted, by the aggregation platform, to the to the requirement owner.

In the ninth implementation form the aggregation platform offers data model extension capability.

According to a second aspect of the invention, the above mentioned and other objectives are achieved with a requirement owner for a communication system, the requirement owner being configured to
transmit a request to an aggregation platform, wherein the transmitted request comprises a request for an aggregation platform data model;
receive an aggregation platform data model from the aggregation platform in response to the transmission of the request, wherein the received aggregation platform data model comprises at least one relationship between at least one model and at least one associated model repository;
generate an aggregation requirement based on the received aggregation platform data model, wherein the generated aggregation requirement comprises at least one a model identifier and at least one associated model repository identifier;
transmit the generated aggregation requirement to the aggregation platform.

The requirement owner according to the second aspect provides a number of advantages over conventional solutions. One such advantage is that the requirement owner according to the second aspect avoids multiple time consuming and non-automated mappings between a requirement and ETSI network service deployment.

In a first possible implementation form of a requirement owner according to the second aspect, the requirement owner is further configured to
receive an operator requirement from an operator, wherein the operator requirement comprises at least one service requirement;
map the received operator requirement onto the received aggregation platform data model so as to obtain an intermediate data model;
generate the aggregation requirement based on the intermediate data model.

The first implementation form provides a data model mapping between the operator requirement and aggregation platform data model.

In a second possible implementation form of a requirement owner according to the first implementation form of the second aspect or to the second aspect as such, the requirement owner is further configured to
receive an extended aggregation platform data model from the aggregation platform;
generate an extended aggregation requirement based on the received extended aggregation platform data model;
transmit the generated extended aggregation requirement to the aggregation platform.

The second implementation form provides an extended aggregation platform data model usage.

In a third possible implementation form of a requirement owner according to the first or second implementation form of the second aspect or to the second aspect as such, the requirement owner is further configured to
transmit a deployment template decoupling request to the deployment platform, wherein the transmitted deployment template decoupling request comprises at least one deployment platform identifier.

The third implementation form provides an automated runtime life-cycle-management capability over deployment templates.

According to a third aspect of the invention, the above mentioned and other objectives are achieved with a method for an aggregation platform, the method comprises:
receiving a request from a requirement owner, wherein the received request comprises a request for an aggregation platform data model;
determining an aggregation platform data model based on the received request, wherein the determined aggregation platform data model comprises at least one relationship between at least one model and at least one associated model repository;
transmitting the determined aggregation platform data model to the requirement owner;
receiving an aggregation requirement from the requirement owner, wherein the received aggregation requirement comprises at least one model identifier and at least one associated model repository identifier;
generating a deployment template based on the received aggregation requirement.

In a first possible implementation form of a method according to the third aspect, the model identifier of the received aggregation requirement comprises a function model identifier, an algorithm model identifier, and a sorting criteria model identifier.

In a second possible implementation form of a method according to the first implementation form of the third aspect or to the third aspect as such, the associated model repository identifier of the received aggregation requirement comprises a function model repository identifier, an algorithm model repository identifier, and a sorting criteria model repository identifier.

In a third possible implementation form of a method according to the second implementation form of the third aspect, the method further comprises
matching the received model identifier and the associated model repository identifier of the aggregation requirement to the model and to the associated model repository so as to obtain at least one matched model;
determining at least one function model and at least one sorting criteria model based on the matched model;
sorting the determined function model based on the determined sorting criteria model so as to obtain a sorted function model;
applying at least one algorithm on the sorted function model based on the algorithm model repository identifier so as to generate the deployment template.

In a fourth possible implementation form of a method according to any of the preceding implementation forms of the third aspect or to the third aspect as such, the determined aggregation platform data model further comprises a description of the model, at least one attribute of the model, at least one description of the model repository, and at least one attribute of the model repository.

In a fifth possible implementation form of a method according to any of the preceding implementation forms of the third aspect or to the third aspect as such, the method further comprises
transmitting the deployment template to a deployment platform.

In a sixth possible implementation form of a method according to any of the preceding implementation forms of the third aspect or to the third aspect as such, the method further comprises
receiving an updated aggregation requirement from the requirement owner;
determining an updated deployment template based on the updated aggregation requirement;
transmitting the updated deployment template to the deployment platform.

In a seventh possible implementation form of a method according to the fifth or sixth implementation form of the third aspect, the method further comprises receiving a matched deployment template from the deployment platform;
decoupling the received matched deployment template into at least one of a function model, a sorting criteria model, and an algorithm model so as to obtain at least one of a decoupled function model, a decoupled sorting criteria model, and a decoupled algorithm model;
storing at least one of the decoupled function model, the decoupled sorting criteria model, and the decoupled algorithm model into the associated model repository.

In an eighth possible implementation form of a method according to any of the preceding implementation forms of the third aspect or to the third aspect as such, the method further comprises
receiving an extension request from an extension owner, wherein the extension request comprises a request for an aggregation platform extension data model;
determining an aggregation platform extension data model based on the extension request;
transmitting the determined aggregation platform extension data model to the extension owner.

In a ninth possible implementation form of a method according to the eighth implementation form of the third aspect, the method further comprises
receiving at least one model extension from the extension owner, wherein the model extension comprises at least one model identifier and at least one associated model repository identifier;
extending the aggregation platform data model based on the received model extension so as to obtain an extended aggregation platform data model.

The extended aggregation platform data model may be transmitted to the requirement owner.

The advantages of any method according to the third aspect are the same as those for the corresponding aggregation platform according to the first aspect.

According to a fourth aspect of the invention, the above mentioned and other objectives are achieved with a method for a requirement owner, the method comprises:
- transmitting a request to an aggregation platform, wherein the transmitted request comprises a request for an aggregation platform data model;
- receiving an aggregation platform data model from the aggregation platform in response to the transmission of the request, wherein the received aggregation platform data model comprises at least one relationship between at least one model and at least one associated model repository;
- generating an aggregation requirement based on the received aggregation platform data model, wherein the generated aggregation requirement comprises at least one a model identifier and at least one associated model repository identifier;
- transmitting the generated aggregation requirement to the aggregation platform.

In a first possible implementation form of a method according to the fourth aspect, the method further comprises
- receiving an operator requirement from an operator, wherein the operator requirement comprises at least one service requirement;
- mapping the received operator requirement onto the received aggregation platform data model so as to obtain an intermediate data model;
- generating the aggregation requirement based on the intermediate data model.

In a second possible implementation form of a method according to the first implementation form of the fourth aspect or to the fourth aspect as such, the method further comprises
- receiving an extended aggregation platform data model from the aggregation platform;
- generating an extended aggregation requirement based on the received extended aggregation platform data model;
- transmitting the generated extended aggregation requirement to the aggregation platform.

In a third possible implementation form of a method according to the first or second implementation form of the fourth aspect or to the fourth aspect as such, the method further comprises
- transmitting a deployment template decupling request to the deployment platform, wherein the transmitted deployment template decupling request comprises at least one deployment platform identifier.

The advantages of any method according to the fourth aspect are the same as those for the corresponding requirement owner according to the second aspect.

The invention also relates to a computer program, characterized in code means, which when run by processing means causes said processing means to execute any method according to the present invention. Further, the invention also relates to a computer program product comprising a computer readable medium and said mentioned computer program, wherein said computer program is included in the computer readable medium, and comprises one or more from the group: ROM (Read-Only Memory), PROM (Programmable ROM), EPROM (Erasable PROM), Flash memory, EEPROM (Electrically EPROM) and hard disk drive.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Embodiments of the invention introduce an aggregation platform and a requirement owner for a communication system. The aggregation platform enables operators to map requirements in design time into customized and purpose fit network aggregations that can be further mapped to customized and purpose fit NFV VNF descriptors for creation of customized and purpose fit NFV network services. The aggregation platform can further be used in runtime where aggregations are broken down or decomposed into smallest autonomous components and used for aggregation update. The aggregation platform can be based on model driven architecture where models, especially Conceptual Models (CMs), are the generally accepted approach to design abstract models of the real world, while executable CM takes this concept one step further and uses a CM also at the instance level (runtime). The most common solution in the industry for the required platform mappings between multiple data models is data driven mapping, while one of the most common aggregation algorithm use case is link aggregation algorithm. Examples of aggregations are link aggregations, route aggregations, in-network aggregations, and carrier aggregations.

Figure 1:
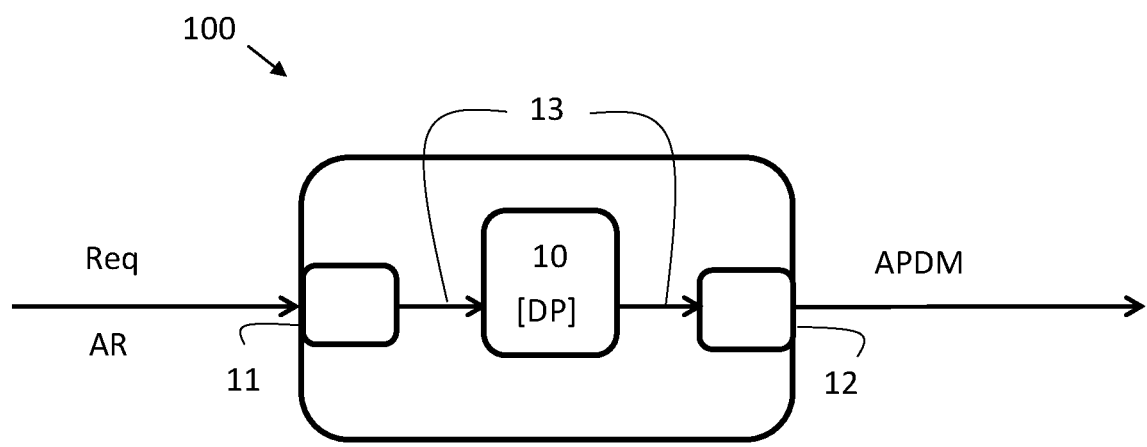
FIG. 1 shows an aggregation platform according to an embodiment of the invention.

FIG. 1 shows an example of such an aggregation platform 100 according to an embodiment of the invention. The aggregation platform 100 comprises in this embodiment at least one processor 10. The processor 10 is coupled to an input device (or input means) 11 and an output device (or output means) 12, respectively, by means of communication capabilities or means 13. The input device 11 is configured to receive one or more communication signals from one or more communication devices. The output device 12 is configured to output and/or transmit one or more communication signals to one or more communication enabling devices. The internal and external communications of the aggregation platform 100 may be performed according to known techniques and protocols in the art but are not limited thereto. Further, the aggregation platform 100 may be a standalone communication enabling device or part of another communication enabling device with suitable capabilities, such as network nodes or general infrastructure communication enabling devices for wired or wireless communications or combinations thereof. Examples of such devices are communication enabling devices configured for communication networks and systems for mentioned future 5G ETSI NFV standards.

Figure 3:
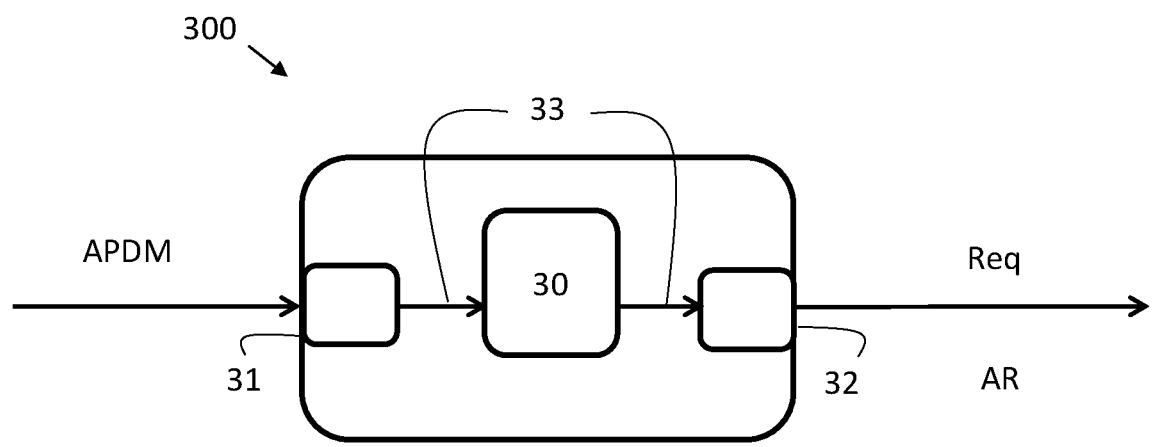
FIG. 3 shows a requirement owner according to an embodiment of the invention.

The aggregation platform 100 in the present configuration is configured to receive a request Req from a requirement owner 300 (see FIG. 3 regarding the requirement owner 300). This is illustrated with the arrow pointing at the input device 11 in FIG. 1. The received request Req comprises a request for an aggregation platform data model APDM. The aggregation platform 100 is configured to determine an aggregation platform data model APDM based on the received request Req. The determined aggregation platform data model APDM comprises at least one relationship between at least one model and at least one associated model repository. The aggregation platform 100 is configured to transmit the determined aggregation platform data model APDM to the requirement owner 300. This is illustrated with the arrow pointing from the output device 12 in FIG. 1. Thereafter, the aggregation platform 100 is configured to receive an aggregation requirement AR from the requirement owner 300 in response to the transmission of the determined aggregation platform data model APDM. The received aggregation requirement AR comprises at least one model identifier and at least one associated model repository identifier. The aggregation platform 100 is configured to generate a deployment template DP based on the received aggregation requirement AR. More specifically, the aggregation platform 100 is configured to generate a deployment template DP based on the content of the aggregation requirement AR, i.e. the at least one model identifier and at least one associated model repository identifier. However, further parameters may be used when generating the deployment template DP.

Figure 2:
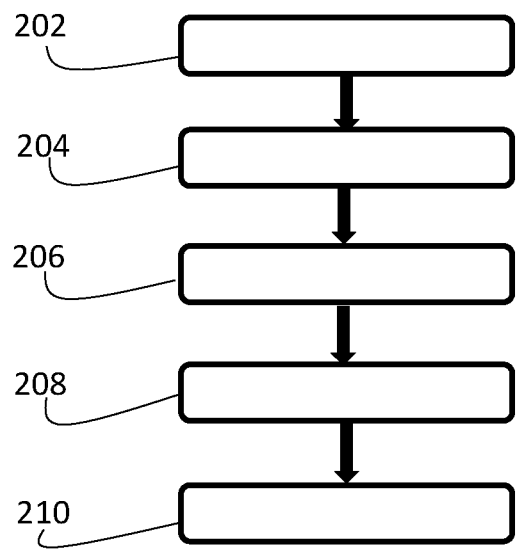
FIG. 2 shows a method for an aggregation platform according to an embodiment of the invention.

FIG. 2 shows a flow chart of a corresponding method 200 which may executed in an aggregation platform 100, such as the one shown in FIG. 1. The method 200 comprises receiving 202 a request Req from a requirement owner 300. The received request Req comprises a request for an aggregation platform data model APDM. The method 200 further comprises determining 204 an aggregation platform data model APDM based on the received request Req. The determined aggregation platform data model APDM comprises at least one relationship between at least one model and at least one associated model repository. The method 200 comprises further transmitting 206 the determined aggregation platform data model APDM to the requirement owner 300. The method 200 further comprises receiving 208 an aggregation requirement AR from the requirement owner 200. The received aggregation requirement AR comprises at least one model identifier and at least one associated model repository identifier. The method 200 further comprises generating 210 a deployment template DP based on the received aggregation requirement AR.

According to an embodiment, the aggregation platform data model APDM further comprises a description of the model, at least one attribute of the model, at least one description of the model repository, and at least one attribute of the model repository.

FIG. 3 shows an example of a requirement owner 300 according to an embodiment of the invention. The requirement owner 300 comprises in this embodiment a processor 30. The processor 30 is coupled to an input device (or input means) 31 and an output device (or output means) 32, respectively, by means of communication means or capabilities 33. The input device 31 is configured to receive one or more signals. The input device 31 is configured to receive one or more communication signals from one or more communication devices. The output device 32 is configured to output and/or transmit one or more communication signals to one or more communication enabling devices. The internal and external communications of the requirement owner 300 may be performed according to known techniques and protocols in the art but are not limited thereto. Further, the requirement owner 300 may be a standalone communication enabling device or part of another communication enabling device with suitable capabilities, such as network nodes or general infrastructure communication enabling devices for wired or wireless communications or combinations thereof. Examples of such devices are communication enabling devices configured for communication networks and systems for mentioned future ETSI NFV standards.

The requirement owner 300 is configured to transmit a request Req to an aggregation platform 100. This is illustrated with the arrow pointing from the output device 32 in FIG. 3. The transmitted request Req comprises a request for an aggregation platform data model APDM. The requirement owner 300 is configured to receive an aggregation platform data model APDM from the aggregation platform 100 in response to the transmission of the request Req. The received aggregation platform data model APDM comprises at least one relationship between at least one model and at least one associated model repository. The requirement owner 300 is configured to generate an aggregation requirement AR based on the received aggregation platform data model APDM. More specifically, the requirement owner 300 is configured to generate the aggregation requirement AR based on the content of the received aggregation platform data model APDM, i.e. the at least one relationship between at least one model and at least one associated model repository. However, further parameters may be used when generating the aggregation requirement AR. The generated aggregation requirement AR comprises at least one a model identifier and at least one associated model repository identifier. The requirement owner 300 is configured to transmit the generated aggregation requirement AR to the aggregation platform 100.

Figure 4:
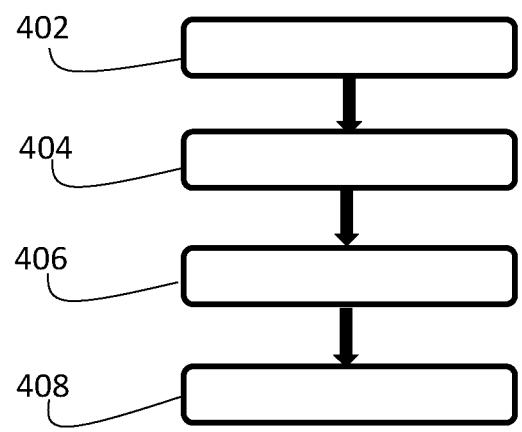
FIG. 4 shows a method for a requirement owner according to an embodiment of the invention.

FIG. 4 shows a corresponding method which may executed in a requirement platform 300, such as the one shown in FIG. 3. The method 400 comprises transmitting 402 a request Req to an aggregation platform 100. The transmitted request Req comprises a request for an aggregation platform data model APDM. The method 400 further comprises receiving 404 an aggregation platform data model APDM from the aggregation platform 100 in response to the transmission of the request Req. The received aggregation platform data model APDM comprises at least one relationship between at least one model and at least one associated model repository. The method 400 further comprises generating 406 an aggregation requirement AR based on the received aggregation platform data model APDM. The generated aggregation requirement AR comprises at least one a model identifier and at least one associated model repository identifier. The method 400 further comprises transmitting 408 the generated aggregation requirement AR to the aggregation platform 100.

According to an embodiment the model identifier of the aggregation requirement AR comprises a function model identifier, an algorithm model identifier, and a criteria model identifier.

According to an embodiment the associated model repository identifier of the aggregation requirement AR comprises a function model repository identifier, an algorithm model repository identifier, and a criteria model repository identifier.

Figure 5:
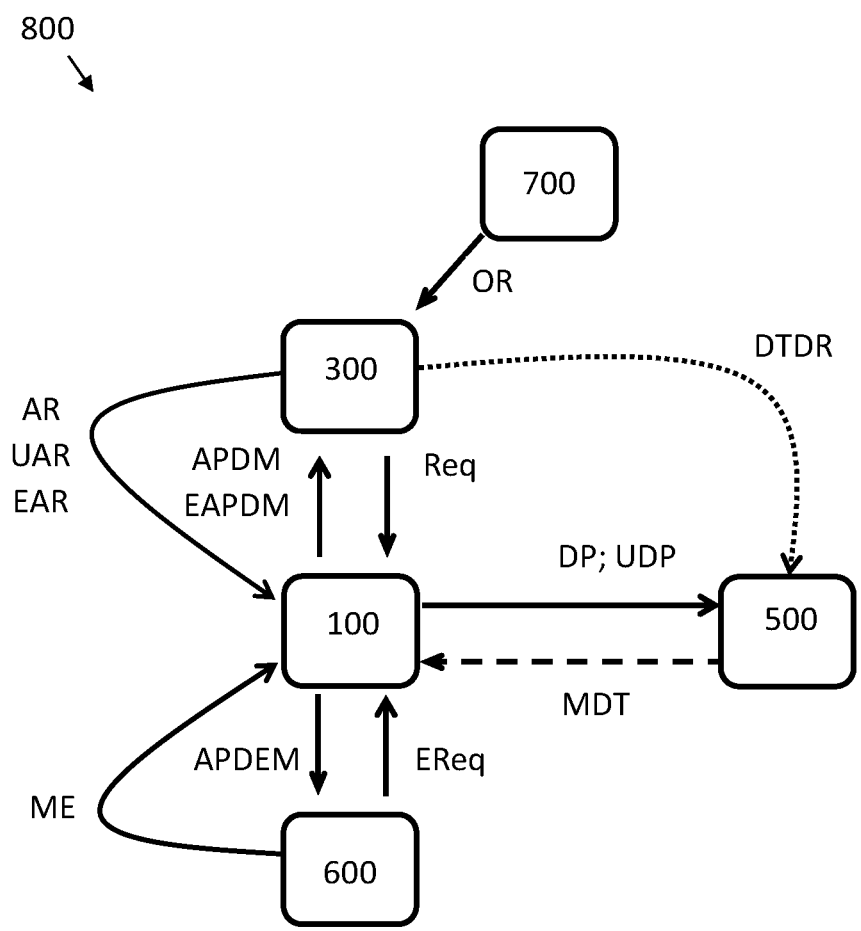
FIG. 5 shows a communication system according to an embodiment of the invention.

FIG. 5 shows an example of a communication system 800 according to an embodiment of the invention. The communication system 800 may be a system according to ETSI NFV standards or any other suitable communications standards. The communication system 800 comprises an aggregation platform 100 and a requirement owner 300 as previously described. However, the communication system 800 also comprises a deployment platform 500 and an extension owner 600 in this particular example. The deployment platform 500 and the extension owner 600 will be described more in detail in the following disclosure. The dotted arrow (i.e. DTDR) in FIG. 5 illustrates control signaling which implies that the requirement owner 300 is configured to control the deployment platform 500. It is to be noted that no confirmation message, i.e. Conf. message, signaling are illustrated in FIG. 5.

Moreover, FIG. 5 illustrates some basic interaction and signaling exchange between the aggregation platform 100 and the requirement owner 300. The aggregation platform 100 receives a request Req from the requirement owner 300. Based on the received request Req the aggregation platform 100 determines an aggregation platform data model APDM and transmits the aggregation platform data model APDM to the requirement owner 300. In response to the received aggregation platform data model APDM the requirement owner 300 generates an aggregation requirement AR and transmits the aggregation requirement AR to the aggregation platform 100. Upon reception of the aggregation requirement AR the aggregation platform 100 generates a deployment template DP based on the received aggregation requirement AR.

In one embodiment the requirement owner 300 receives an operator requirement OR from an operator 700 as shown in FIG. 5. The operator requirement OR comprises at least one service requirement. The requirement owner 300 is therefore configured to map the received operator requirement OR onto the received aggregation platform data model APDM form the aggregation platform so as to obtain an intermediate data model. The requirement owner 300 generates the aggregation requirement AR based on the intermediate data model.

Figure 6:
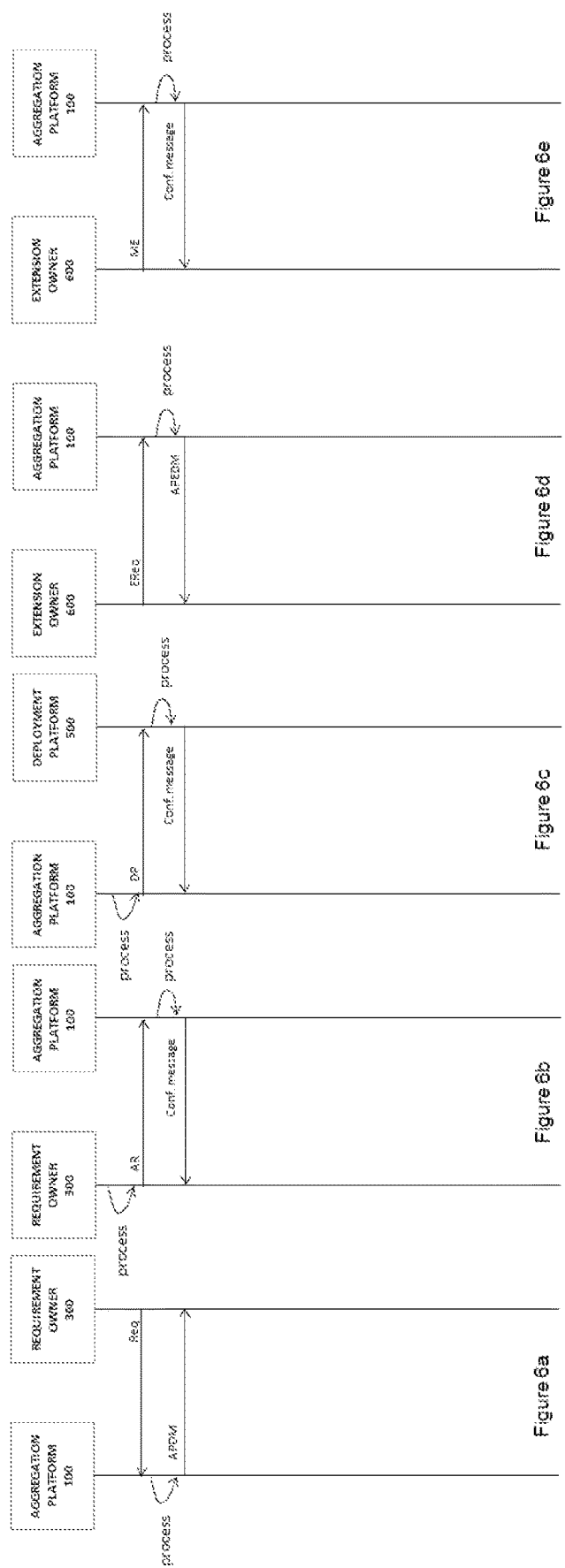
FIG. 6 shows design time message flow according to an embodiment of the invention.

FIG. 6 describes the design time according to embodiments of the invention. It should be noted that the expression "process" in the appended Figs. relates to one or more processing steps or instructions performed within the scope of embodiments of the invention. The processing denoted "process" may e.g. relate to one or more of making decisions, generating information elements parameters, customization, updating, mapping, executing, decoupling, determining, triggering, identifying, dividing, etc.

In FIG. 6a, the requirement owner 300 sends aggregation capability access requirement to the capability of the aggregation platform 100 in the form of a request Req, most likely through exposed Application Programming Interface (API) or any other suitable programming interface. The aggregation platform 100 complies (denoted process in the Fig.) to the request Req by sending an aggregation platform data model APDM to the requirement owner 300 for customization.

In FIG. 6b, the requirement owner 300 first maps (denoted process in the Fig.) its service requirement data model into the customized aggregation requirement data model ARDM and thereafter sends the aggregation requirement AR to the aggregation platform 100. After the aggregation platform 100 executes the aggregation requirement AR (denoted process in the Fig.) the aggregation platform 100 sends back the execution confirmation (Conf. message in the Fig.) to the requirement owner 300.

In FIG. 6c, the aggregation platform 100 executes the aggregation requirements AR (denoted process in the Fig.) so as to generate a deployment template DP. Thereafter, the aggregation platform 100 sends the deployment template DP to the deployment platform 500. After the aggregation deployment is executed based on the deployment template DP, the deployment platform 500 sends back an execution confirmation (Conf. message in the Fig).

In FIG. 6d, the extension owner 600 requires the aggregation platform extension data model APEDM of the aggregation platform 100 by transmitting an extension request EReq to the aggregation platform 100, most likely through exposed API. The aggregation platform 100 responds by transmitting the aggregation platform extension data model APEDM to the requirement owner 300.

In FIG. 6e, the extension owner 600 first maps its physical function data into the provided aggregation platform extension data model APEDM. Thereafter, the extension owner 600 sends the model extension ME to the aggregation platform 100. After the aggregation platform 100 executes the model extension ME data (denoted process in the Fig.), and the aggregation platform 100 sends back the execution confirmation (Conf. message in the Fig.) to the extension owner 600.

Figure 7:
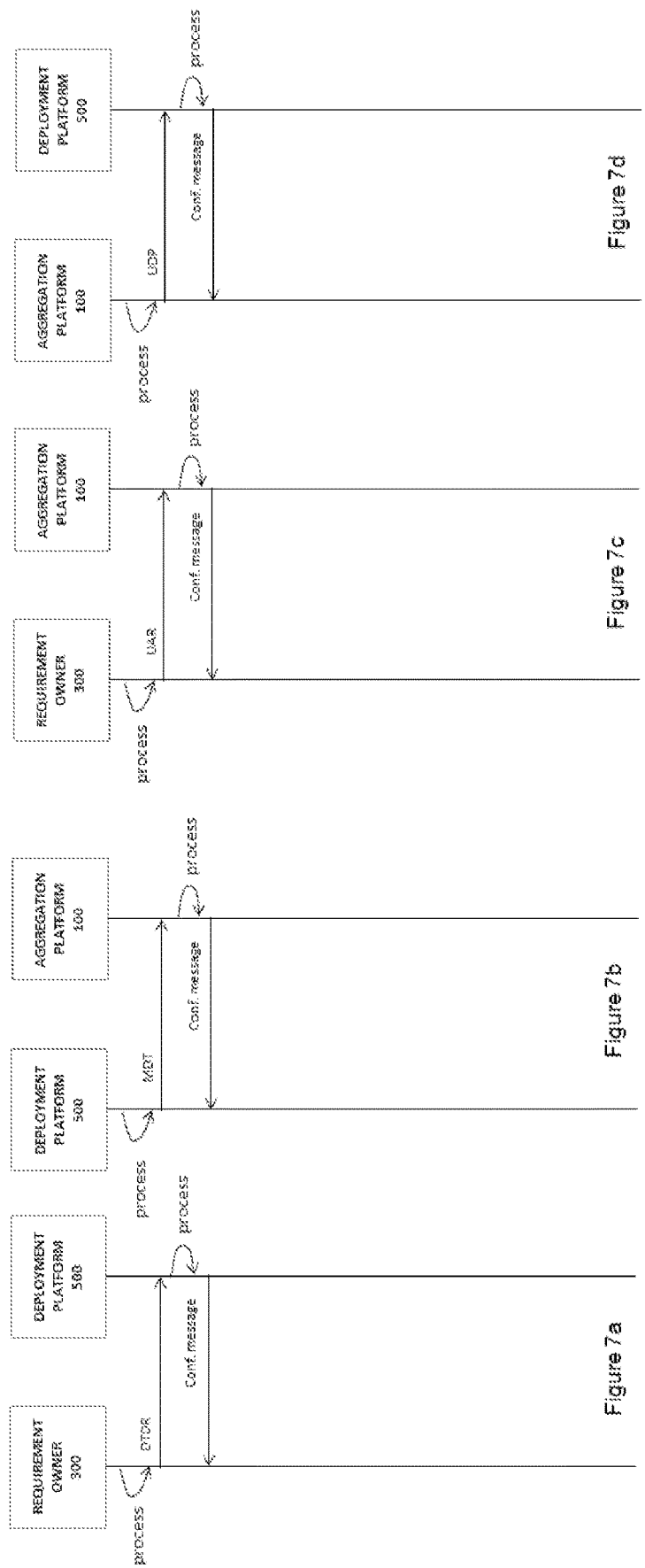
FIG. 7 shows runtime message flow according to an embodiment of the invention.

FIGS. 7a and 7b describe the design time and FIGS. 7c and 7d describe the runtime according to embodiments of the invention.

In FIG. 7a, the requirement owner 300 sends a deployment template decoupling request DTDR, by means of control signaling, to the deployment platform 500 that impacts deployed network function aggregations. Thereafter, the deployment platform 500 executes the function aggregation template update (denoted process in the Fig.), and sends an execution confirmation (Conf. message in the Fig) to the requirement owner 300.

In FIG. 7b, the deployment platform 500 sends back a matched deployment template MDT to the aggregation platform 100. The aggregation platform 100 responds by sending a confirmation to the deployment platform (Conf. message in the Fig). After receiving the matched deployment template MDT, the aggregation platform 100 triggers the decupling that decouples the received matched deployment template MDT into at least one of a function model, a sorting criteria model, and an algorithm model so as to obtain at least one of a decoupled function model, a decoupled sorting criteria model, and a decoupled algorithm model. Finally, at least one of the decoupled function model, the decoupled sorting criteria model, and the decoupled algorithm model are stored into the associated model repository.

In FIG. 7c, the requirement owner 300 sends an updated aggregation requirement UAR to the aggregation platform 100. After receiving the updated aggregation requirement UAR, the aggregation platform 100 triggers the update (denoted process in the Fig.) that executes the aggregation deployment template update and sends back the execution confirmation (Conf. message in the Fig) to the requirement owner 300.

In FIG. 7d the aggregation platforms 100 sends the updated deployment template UDP to the deployment platform 300. After receiving the updated deployment template UDP, the deployment template 300 triggers the deployment template update (denoted process in the Fig.) that executes the deployment template update and sends back the execution confirmation (Conf. message in the Fig) to the aggregation platform 100.

Figure 8:
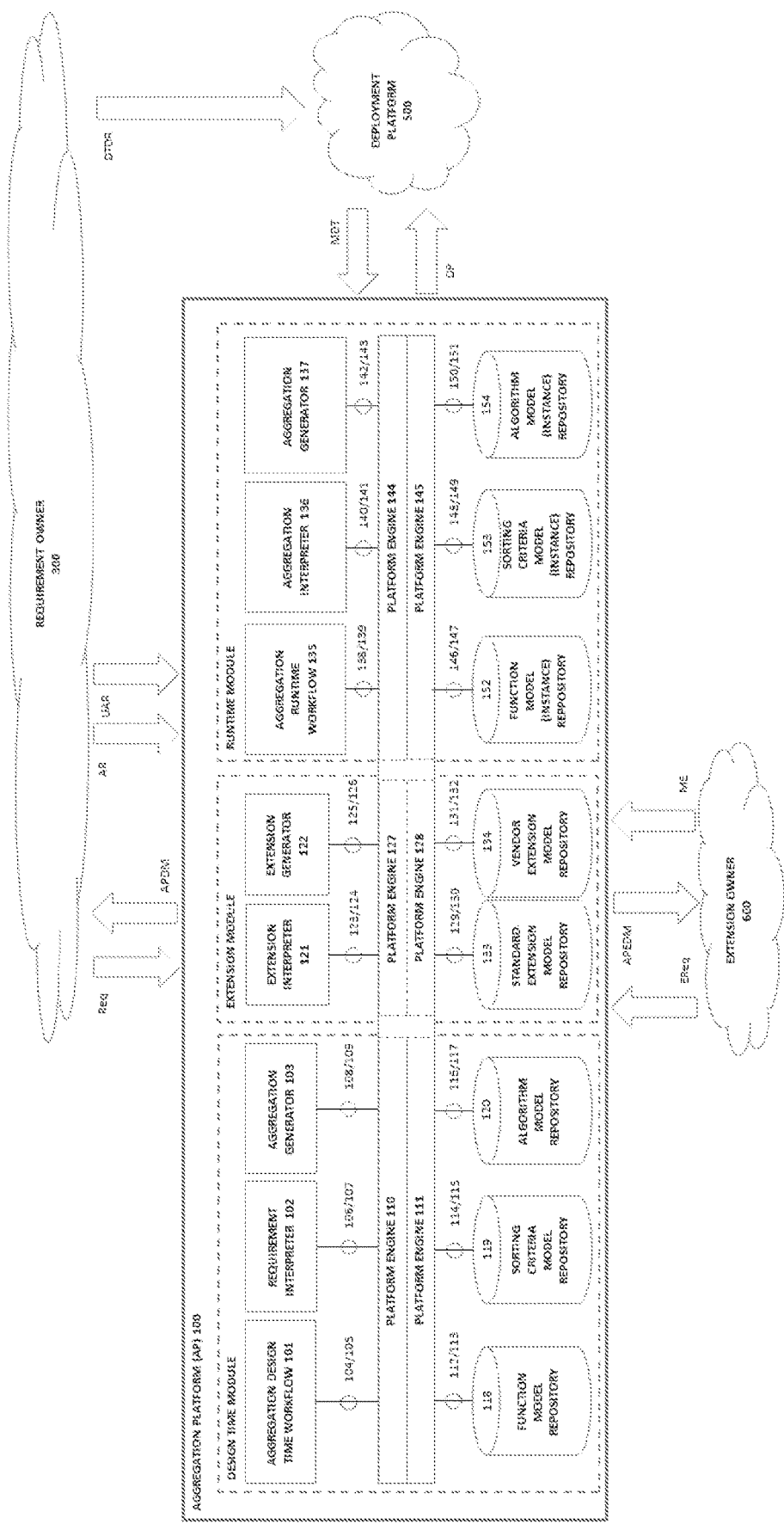
FIG. 8 shows an internal architecture of the aggregation platform according to an embodiment of the invention.

The aggregation platform 100 internal architecture, according to an embodiment, can be seen in FIG. 8. Therein functional blocks, inventories, relationships and interface reference points are shown with reference numerals. Major signaling are also illustrated between the aggregation platform 100 and the requirement owner 300, the deployment platform 500 and the extension owner 600 (compare with FIG. 5).

The aggregation platform 100 can in this respect be broken down into three major modules, i.e.: a design time module (to the left), an extension module (in the middle), and a runtime module (to the right). Each module comprises different associated platform engines 110, 111; 127, 128; 144, 145 which are described in the following disclosure.

The design time module can in turn be broken down further into three function blocks and three model repositories. The function blocks of the design time module are:
Aggregation design time workflow 101.
Requirement interpreter 102.
Aggregation generator 103.
The model repositories of the design time module are:
Function model repository 118.
Sorting criteria model repository 119.
Algorithm model repository 120.

The extension module can in turn be broken down in two function blocks and two model repositories. The function blocks of the extension time module are:
Extension (plug-in) interpreter 121.
Extension (plug-in) generator 122.
The model repositories of the extension module are:
Standard extension (plug-in) model repository 133.
Vendor extension (plug-in) model repository 134.

The runtime module can be broken down in three function blocks and three model repositories. The function blocks of the runtime module are:
Aggregation runtime workflow 135.
Aggregation interpreter 136.
Aggregation generator 137.
The model repositories of the runtime module are:
Function model (instance) repository 152.
Sorting criteria model (instance) repository 153.
Algorithm model (instance) repository 154.

Figure 9:
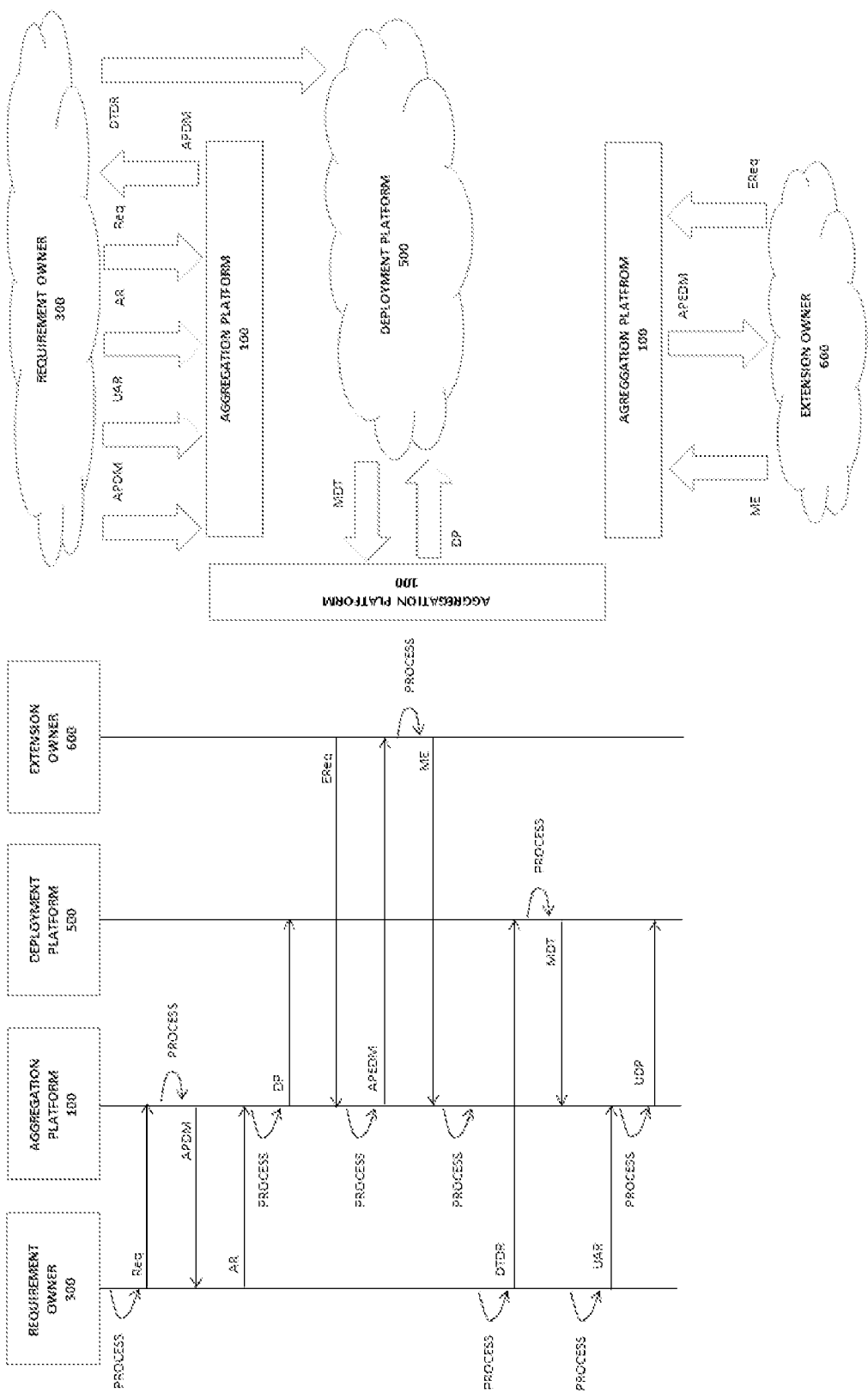
FIG. 9 shows a diagram of external communication of the aggregation platform according to an embodiment of the invention.

FIG. 9 illustrates a flow chart (to the left of the Fig.) and associated functional blocks (to the right of the Fig.) of a communication system 800 according to an embodiment of the invention. In FIG. 9 it is shown how the aggregation platform 100 communicates with the requirement owner 300, the deployment platform 500 and the extension owner 600, respectively. On request, the aggregation platform 100 provides access to its capacities for customization by means of the request Req and aggregation platform data model APDM signaling with the requirement owner 300 as previously described. From the requirement owner 300, the aggregation platform 100 can receive two types of inputs, i.e. updated aggregation requirement UAR in runtime (only illustrated in the right Fig.) and the aggregation requirement AR in the design time. In the design time, the aggregation platform 100 sends a deployment template DP to the deployment platform 500, or in the runtime the aggregation platform 100 receives aggregation deployment templates for update as matched deployment template MDT from the deployment platform 500. The extension owner 600 can request access from the aggregation platform 100 to an aggregation platform extension data model APEDM by transmitting an extension request EReq to the aggregation platform 100.

Also, the transmission of a model extension ME from the extension owner 600 to the aggregation platform 100 is illustrated in FIG. 9. The aggregation platform 100 receives at least one model extension ME from the extension owner 600. The model extension ME comprises at least one model identifier and at least one associated model repository identifier. Further, the aggregation platform 100 extends the aggregation platform data model APDM based on the model extension ME so as to obtain an extended aggregation platform data model EAPDM. The extended aggregation platform data model EAPDM is sent to the requirement owner 300 which is illustrated in FIG. 5.

Furthermore, it is shown in FIG. 9 the control signaling of the deployment template decupling request DTDR from the requirement owner 300 to the deployment platform 500, which triggers the transmission of the matched deployment template MDT from the deployment platform 500 to the aggregation platform. Moreover, the transmission of the updated aggregation requirement UAR from the requirement owner 300 to the aggregation platform 100 is illustrated which triggers the transmission of the updated deployment template UDP from the aggregation platform 100 to the deployment platform 500.

Figure 10:
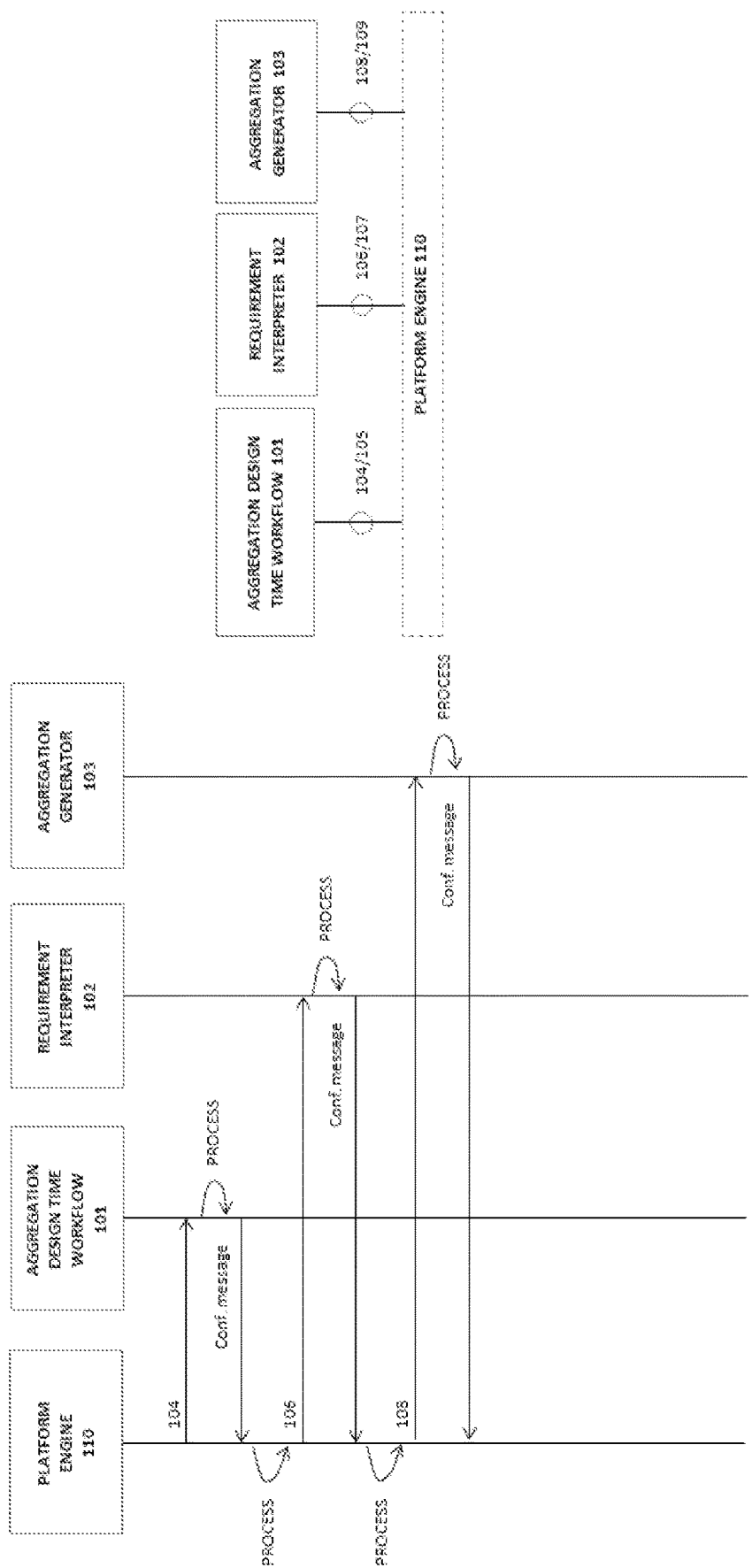
FIG. 10 shows aggregation platform engine and design time function blocks according to an embodiment of the invention.

FIG. 10 shows in more detail the platform engine 110 of the aggregation platform 100 in the design time module, see FIG. 8. In FIG. 10, the platform engine 110 requests 104 the aggregation design time workflow from the associated aggregation design time workflow 101 and calls 106 the requirement interpreter 102 for an aggregation requirement analysis (denoted as process in the Fig.). Based on the requirement interpreter 102 output (denoted as process in the Fig.), the aggregation generator 103 is called 108 to interpret the aggregation requirement AR. Interpret may in this context mean to understand and divide the aggregation requirement AR into smaller tasks such as function model matching, sorting criteria matching, algorithm matching, and aggregation deployment matching.

Figure 11:
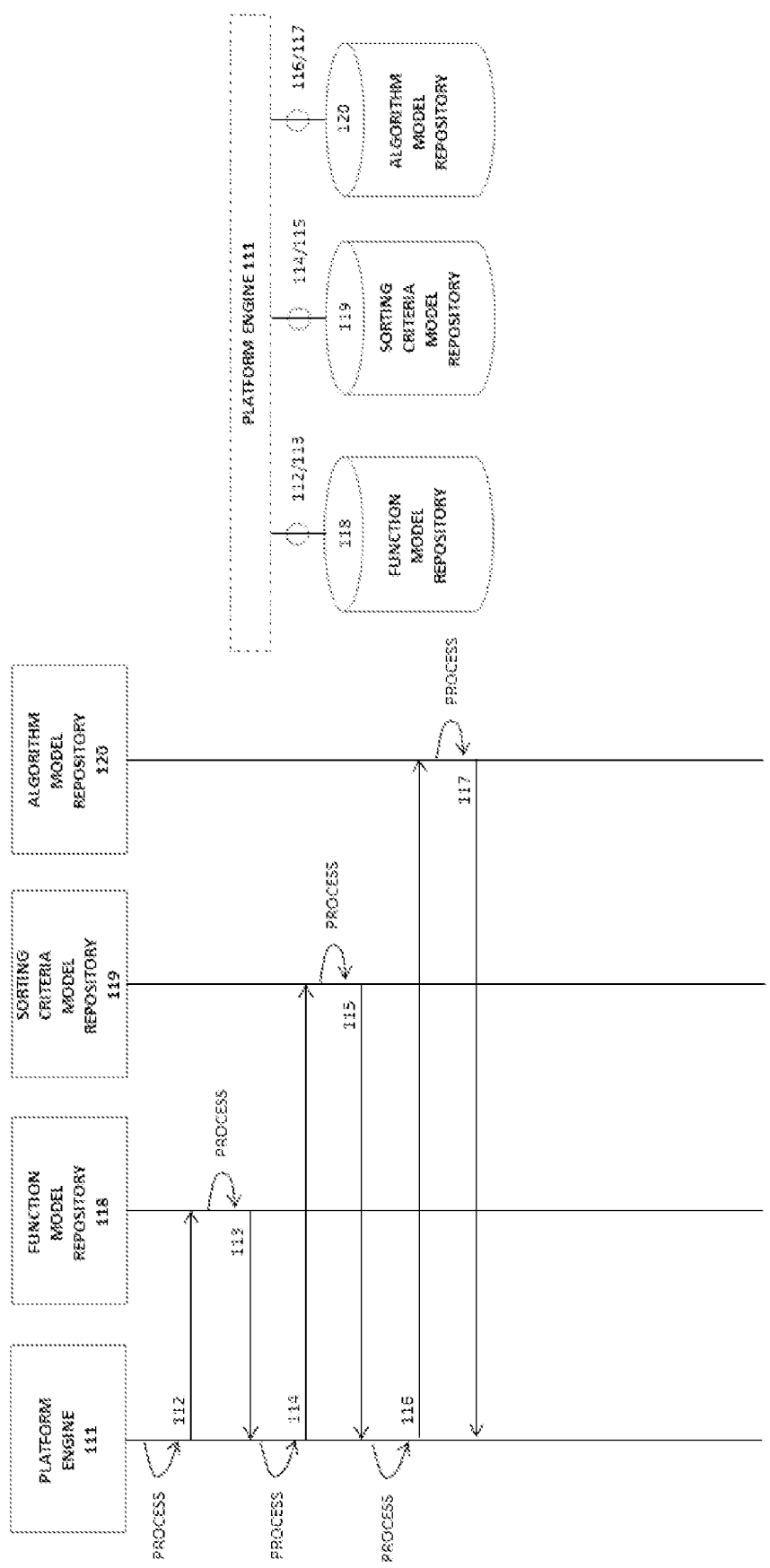
FIG. 11 shows aggregation platform engine and design time repositories according to an embodiment of the invention.

FIG. 11 shows in more detail the platform engine 111 of the aggregation platform 100 in the design time module, see FIG. 8. In FIG. 11, the platform engine 111 uses the received aggregation requirement AR to match 112, 114, 116, function, sorting criteria and algorithm model repositories by calling function model repository 118, sorting criteria model repository 119, and algorithm model repository 120, respectively. Further, the associated models which are the function model, sorting criteria model and algorithm model are also used by the aggregation platform 100 to match.

Figure 12:
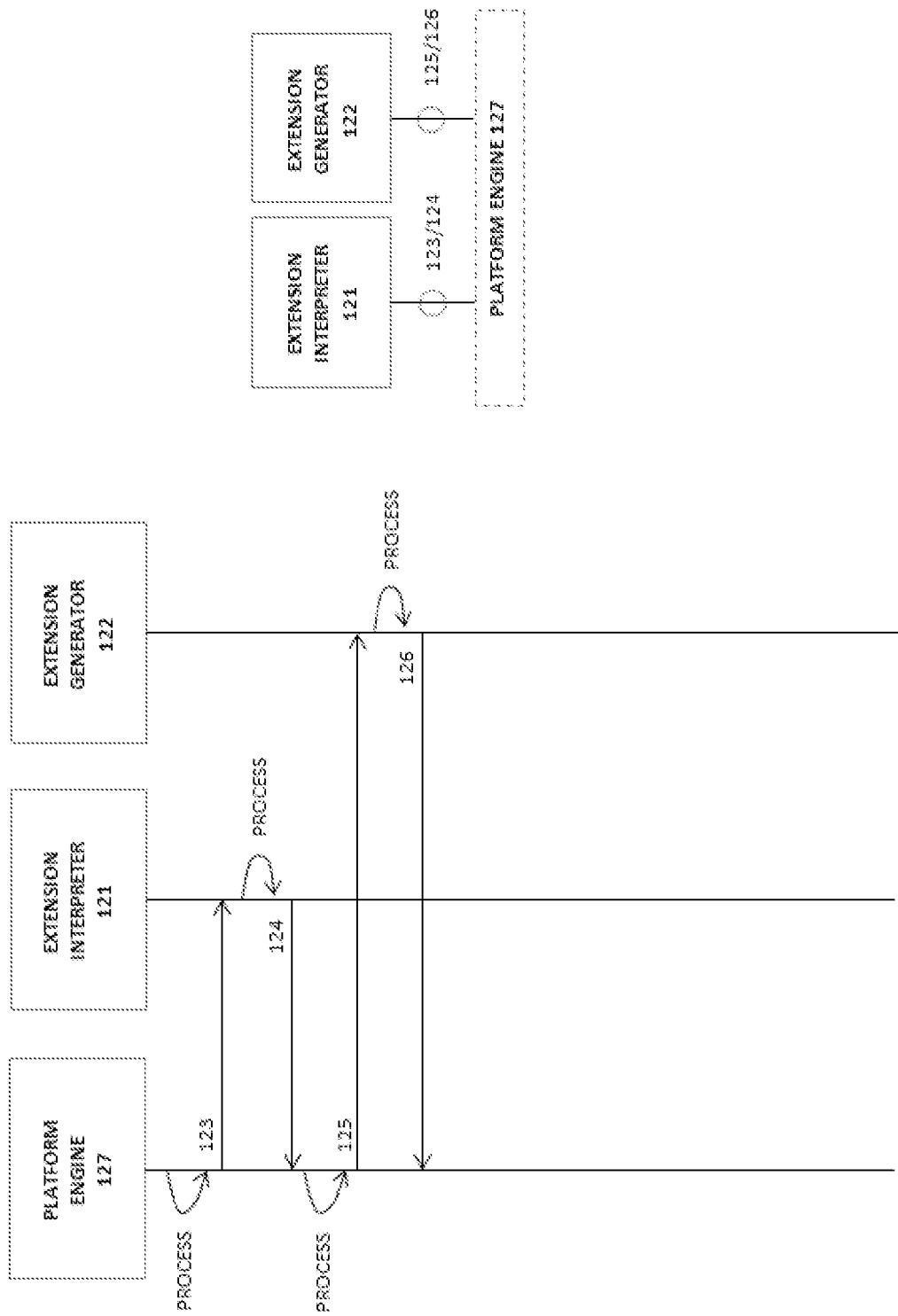
FIG. 12 shows aggregation platform engine and model extension plug-in function blocks according to an embodiment of the invention.

FIG. 12 shows in more detail the platform engine 127 of the aggregation platform 100 in the extension module, see FIG. 8. In FIG. 12, the platform engine 127 either calls 125 the extension generator 122 or calls 123 the extension interpreter 121. These two options are available because the extension plug-in can be developed and provided outside of the aggregation platform 100 from the extension owner 600 when extension interpreter 121 is used, or the extension plug-in can be developed and provided by the aggregation platform 100 through plug-in software installation when the extension interpreter 122 is used.

Figure 13:
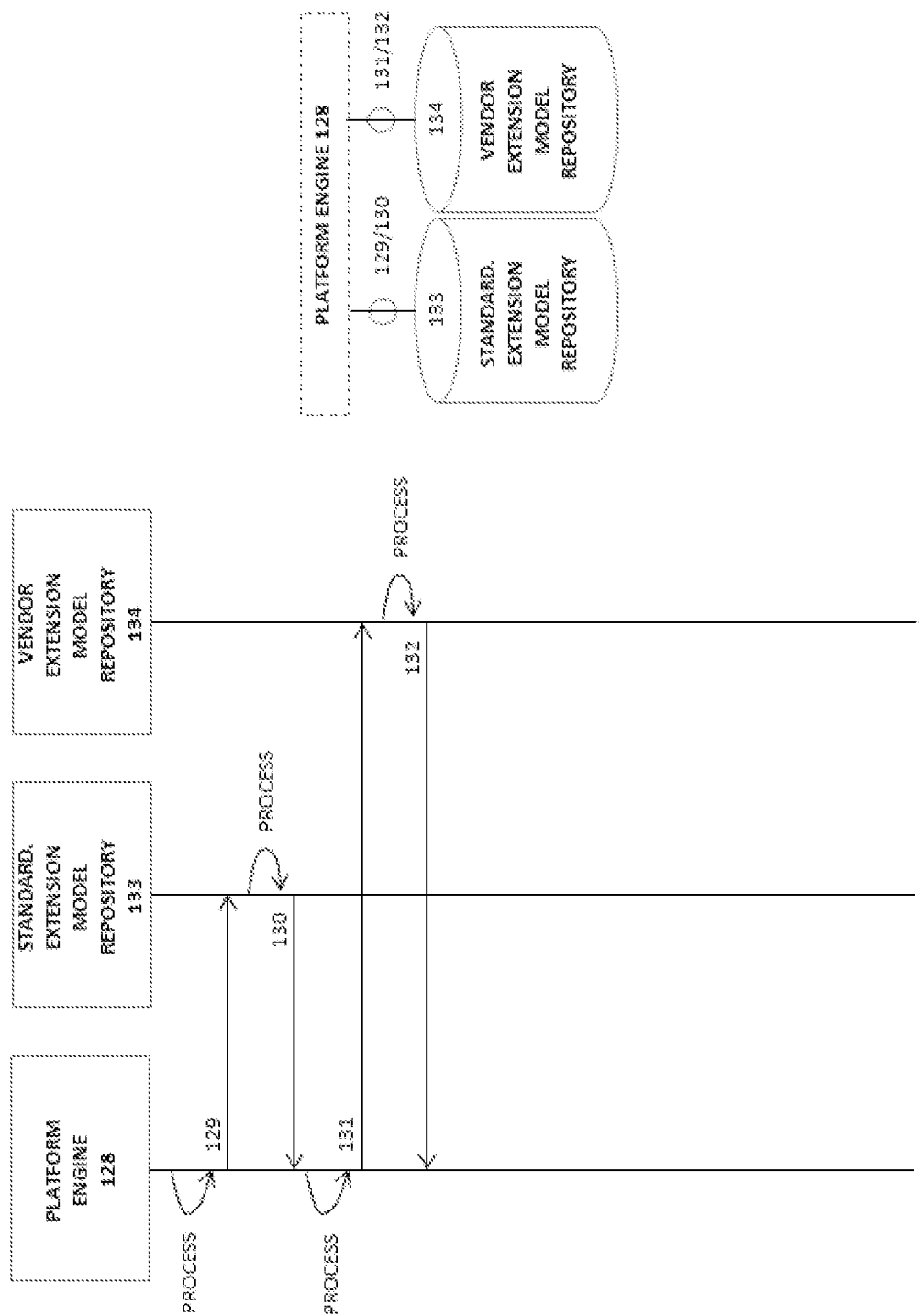
FIG. 13 shows aggregation platform engine and model extension plug-in repositories according to an embodiment of the invention.

FIG. 13 shows in more detail the platform engine 128 of the aggregation platform 100 in the extension module, see FIG. 8. In FIG. 13, the platform engine 128 uses the received model extension ME data to extend the existing aggregation platform 100 conceptual models into the aggregation platform 100 physical models, while storing the result in standardization extension model repository 133 and vendor 134 extension model repository by calling them 129, 131.

Figure 14:
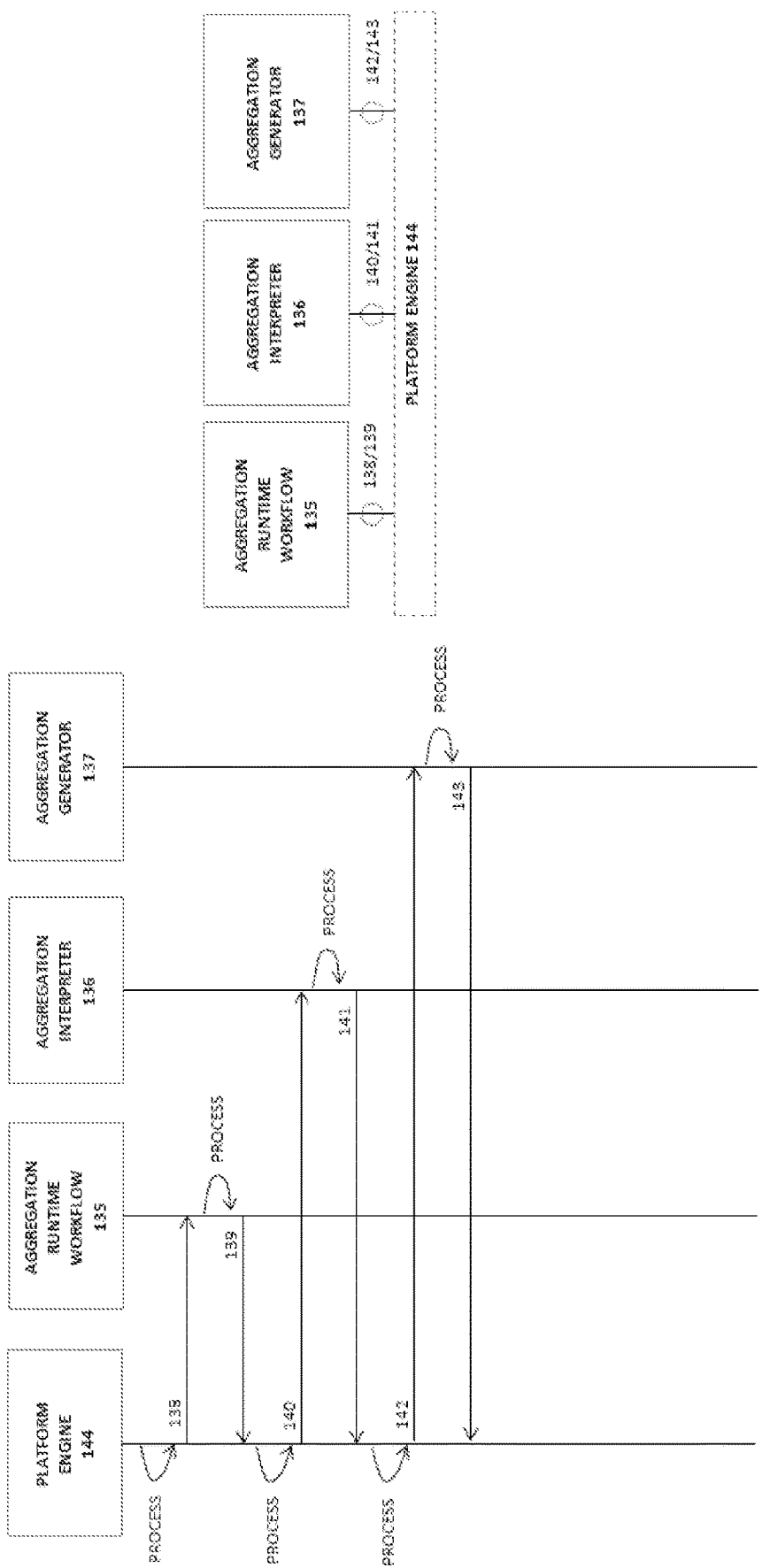
FIG. 14 shows aggregation platform engine and runtime function blocks according to an embodiment of the invention.

FIG. 14 shows in more detail the platform engine 144 of the aggregation platform 100 in the runtime module, see FIG. 8. In FIG. 14, the platform engine 144 transmits a message 138 requesting workflow from the aggregation runtime workflow data 135. to call 140, 141 the aggregation interpreter 136 and to call 142, 143 the aggregation generator 137, in case the aggregation platform 100 receives an updated aggregation requirement UAR and/or a matched deployment template MDT from the deployment platform 500.

Figure 15:
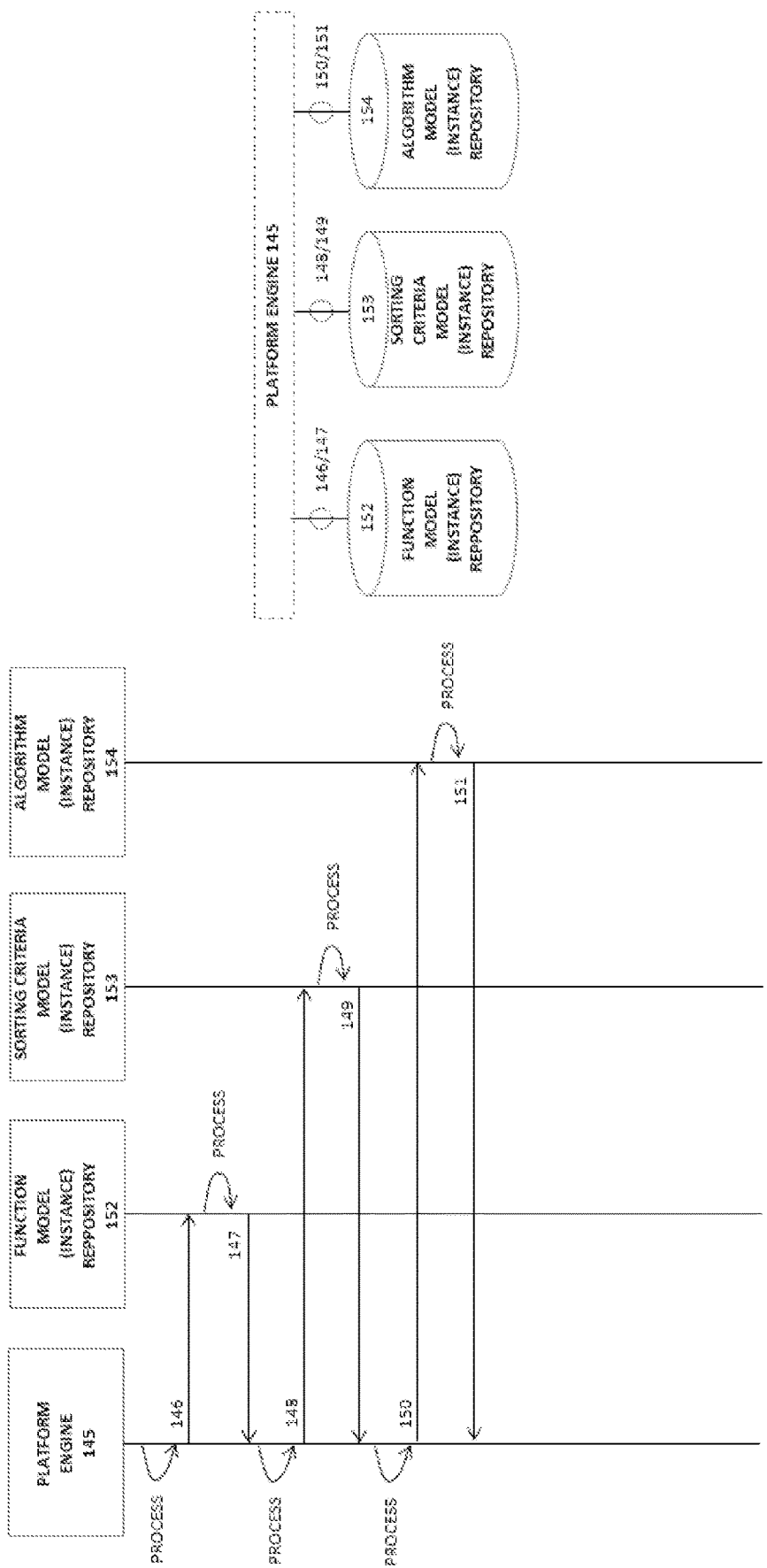
FIG. 15 shows aggregation engine and runtime repositories according to an embodiment of the invention.

FIG. 15 shows in more detail the platform engine 145 of the aggregation platform 100 in the runtime module, see FIG. 8. In FIG. 15, the platform engine 145 uses the aggregation runtime time workflow data 135 and the received updated aggregation requirement UAR to decompose the aggregation template into function, sorting criteria and algorithm model instances and store them in the associated function model repository 152, sorting criteria model repository 153 and algorithm model repository 154.

Figure 16:
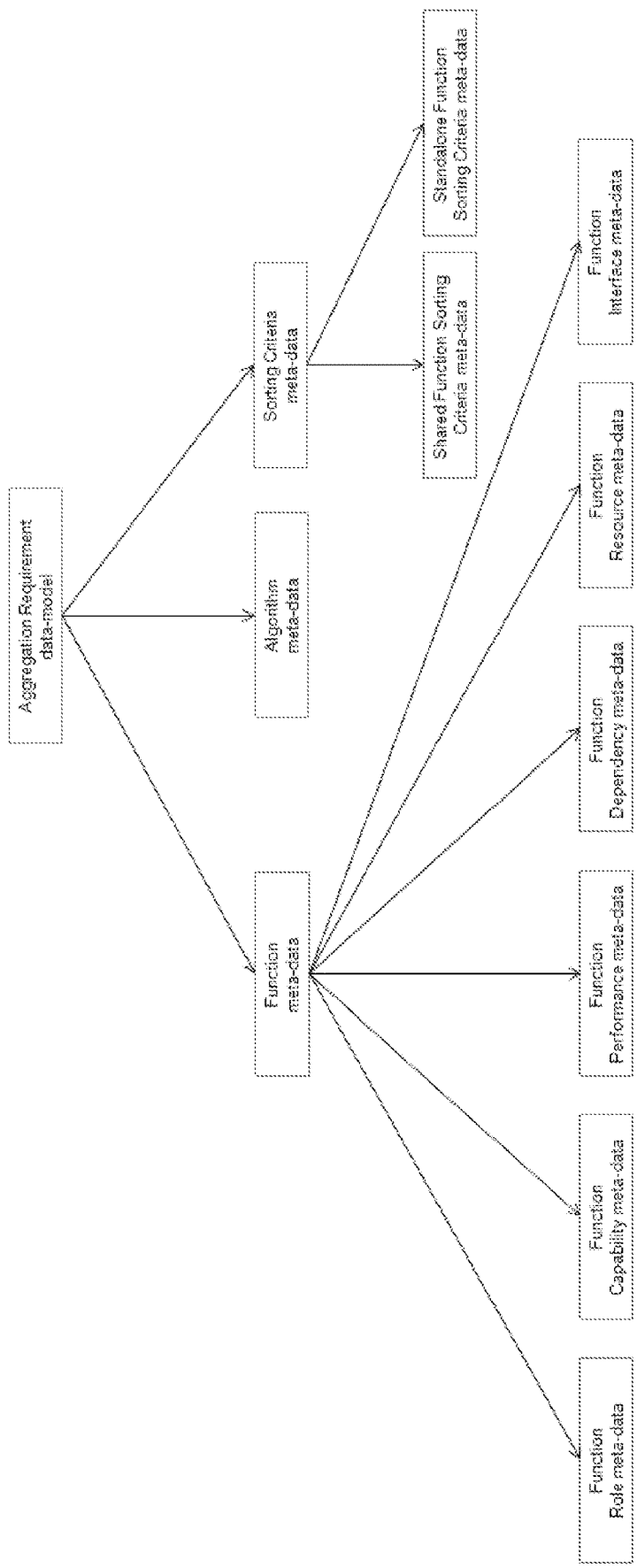
FIG. 16 shows an aggregation requirement data model according to an embodiment of the invention.

FIG. 16 shows an example of a general structure aggregation requirement data model. In FIG. 16, it can be seen how aggregation requirement data model is structured by default, i.e. before customization. The mapping between different requirement meta data will be done with data-driven mapping algorithms by the requirement owner 300. Aggregation requirement data model has direct relationship with function meta data, algorithm meta data and sorting criteria meta data illustrated with the arrows from the aggregation requirement data model box at the top. Function meta data has relationship with role meta data, capability meta data, performance meta data, dependency meta data, resource meta data and interface meta data. While sorting criteria meta data has relationship with shared function sorting criteria meta data and standalone function sorting criteria meta data.

Figure 17:
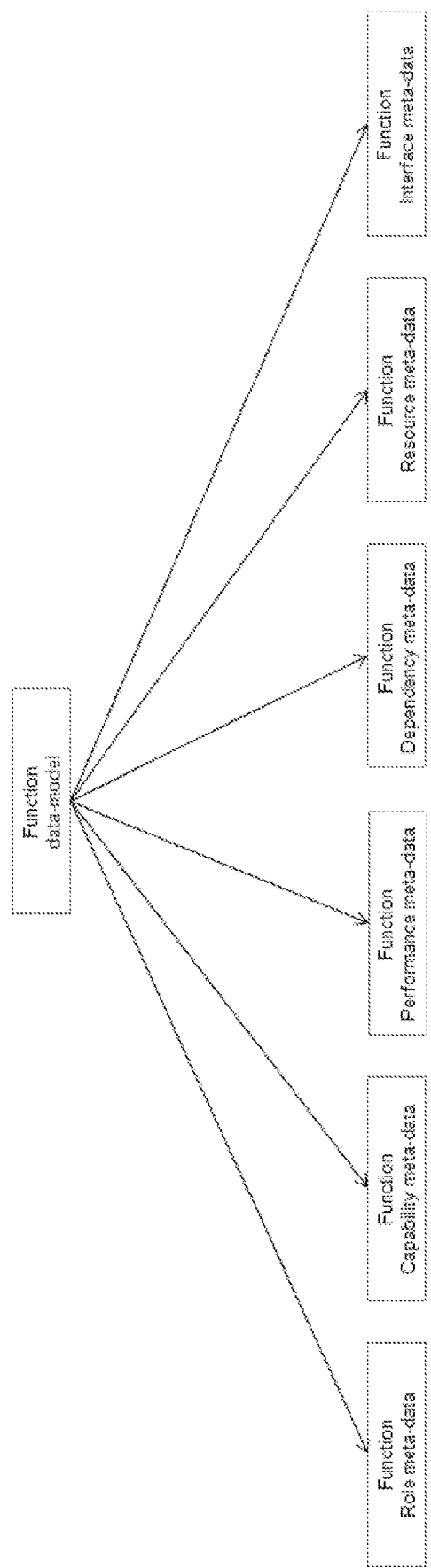
FIG. 17 shows a function data model according to an embodiment of the invention.

FIG. 17 shows an example of the function data model. As illustrated in FIG. 17, the function data model is used as part of aggregation requirement data model customization process. The function data model will be used by the requirement owner 300 to map at least one service requirement data model into six different function meta data types, i.e.: role meta data, capability meta data, performance meta data, dependency meta data, resource meta data and interface meta data.

Figure 18:
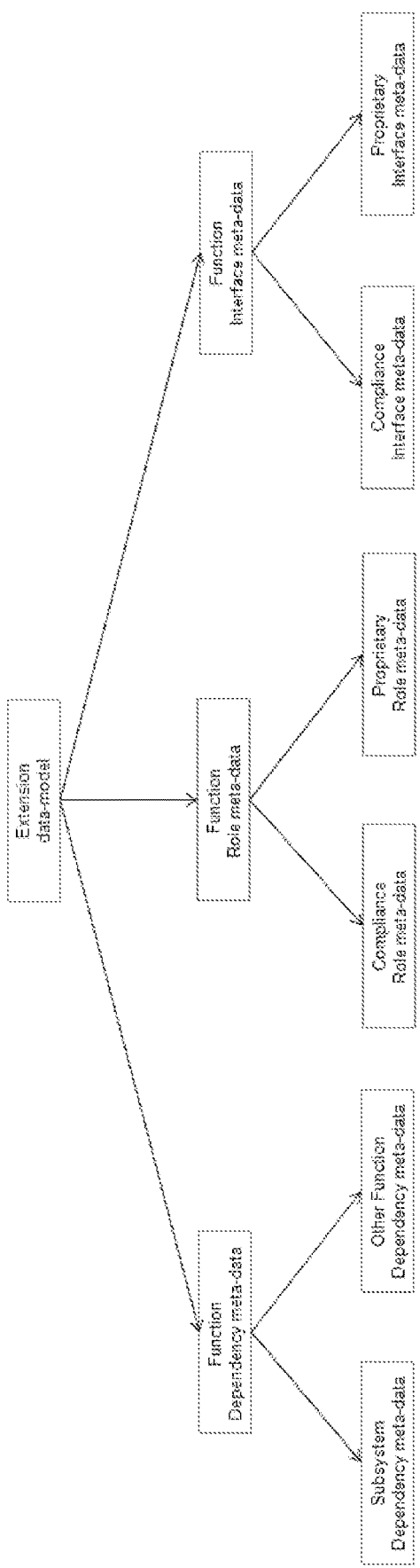
FIG. 18 shows a model extension data model according to an embodiment of the invention.

FIG. 18 shows an example of the extension data model. In FIG. 18, it is shown how the model extension plug-in data structure extends function conceptual model with meta data types of dependency, role and interface into real-life physical function models. The function extension plug-in development can be done through plug-in Software Development Kit (SDK) that is either part of the aggregation platform 100 or it is part of an external system SDK. It is shown that the extension data model has a direct relationship with the function dependency meta data, function role meta data, and function interface meta data. The function dependency has direct relationship with subsystem dependency meta data and other function dependency meta data. The function role meta data has direct relationship with compliance role meta data and proprietary role meta data. The function interface meta data has direct relationship with compliance interface meta data and proprietary interface meta data.

Figure 19:
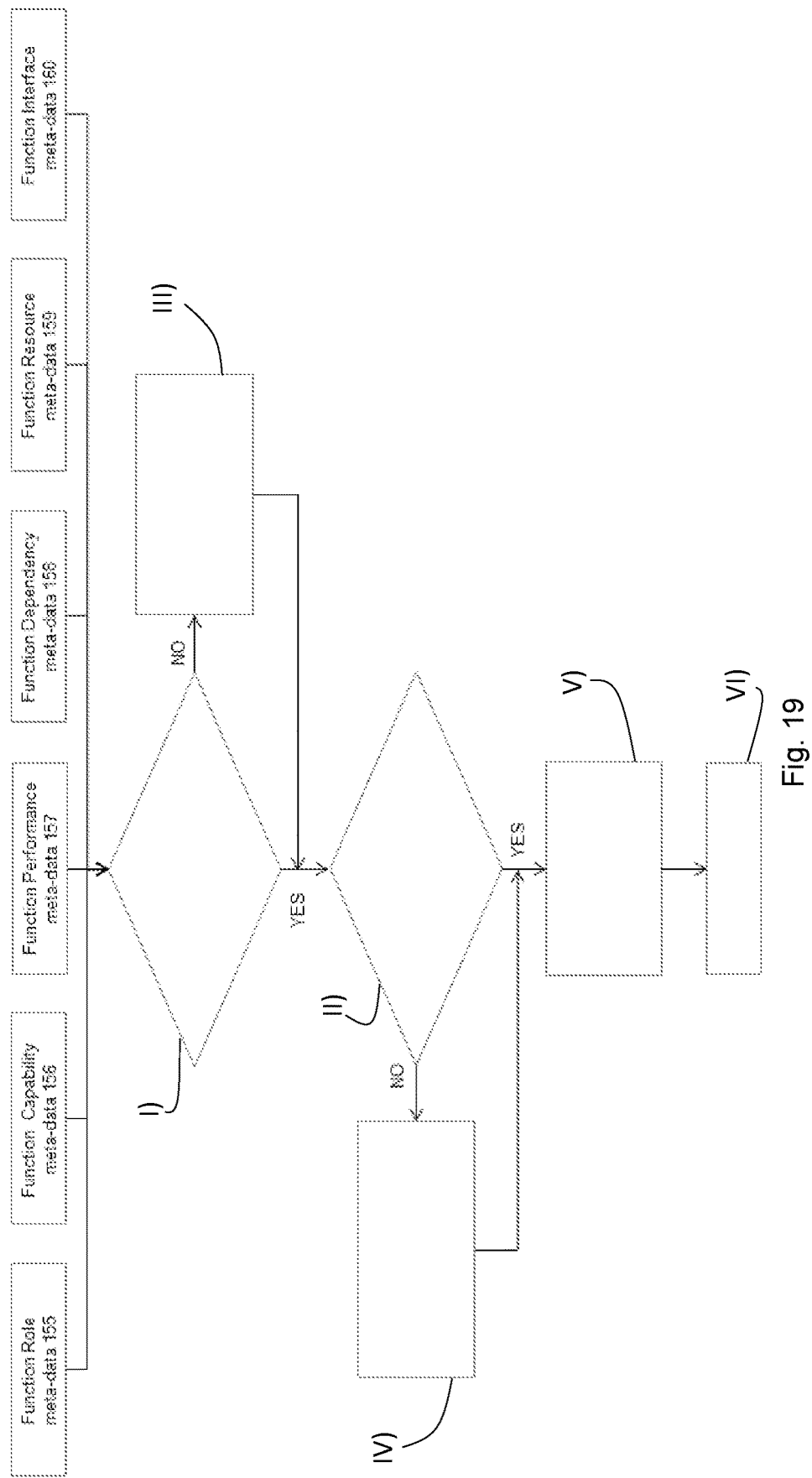
FIG. 19 shows a flow chart for internal decisions in an aggregation platform according to an embodiment of the invention.

FIG. 19 shows the flow chart decision that is taken in the aggregation platform 100 to output the function aggregation deployment template DP. First the function models need to be matched and associated meta data identified, i.e. can role meta data 155, capability meta data 156, performance meta data 157, dependency meta data 158, resource meta data 159 and interface meta data 160 be matched. After that it is checked if the shared function sorting criteria can be executed using the aggregation requirement AR at decision I). If NO at decision I) an aggregation requirement AR with sorting function criterion is requested at box III). If YES at decision I) the next decision at decision II) is if the standalone function sorting criteria can be executed using the aggregation requirement AR. If NO at decision II) an aggregation requirement AR with a standalone function sorting criterion is requested at box IV). If YES at decision II) the function aggregation is executed at box V) and if successfully executed at box V) the process goes to the final box VI).

Any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the aggregation platform 100 and the requirement owner 300 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor of the aggregation platform 100 and the requirement owner 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A device for a communication system, comprising:
at least one processor; and
one or more memories coupled to the at least one processor and storing programming instructions for execution by the at least one processor to:
receive a request from a second device, wherein the received request comprises a request for an aggregation platform data model (APDM);
determine the APDM based on the received request, wherein the determined APDM comprises at least one relationship between at least one model and at least one associated model repository, wherein the at least one model is stored in the at least one associated model repository and described by the APDM;
transmit the determined APDM to the second device;
after transmitting the determined APDM to the second device, receive an aggregation requirement (AR) including a plurality of tasks from the second device, wherein the received AR comprises at least one model identifier and at least one associated model repository identifier; and
executing the AR to generate a deployment template (DP), wherein the DP is used to deploy at least one service required by the second device.

2. The device according to claim 1, wherein the model identifier of the received AR comprises a function model identifier, an algorithm model identifier, and a sorting criteria model identifier.

3. The device according to claim 1, wherein the associated model repository identifier of the received AR comprises a function model repository identifier, an algorithm model repository identifier, and a sorting criteria model repository identifier.

4. The device according to claim 3, wherein the programming instructions are for execution by the at least one processor to:
match the received model identifier and the associated model repository identifier of the AR to the model and to the associated model repository to obtain at least one matched model;
determine at least one function model and at least one sorting criteria model based on the at least one matched model;
sort the determined function model based on the determined sorting criteria model to obtain a sorted function model; and apply at least one algorithm on the sorted function model based on the algorithm model repository identifier to generate the DP.

5. The device according claim 1, wherein the determined APDM further comprises a description of the model, at least one attribute of the model, at least one description of the model repository, and at least one attribute of the model repository.

6. The device according to claim 1, wherein the programming instructions are for execution by the at least one processor to:
transmit the DP to a deployment platform.

7. The device according to claim 6, wherein the programming instructions are for execution by the at least one processor to:
receive an updated aggregation requirement (UAR) from the second device;
determine an updated deployment template (UDP) based on the UAR; and
transmit the UDP to the deployment platform.

8. The device according to claim 6, wherein the programming instructions are for execution by the at least one processor to:
receive a matched deployment template (MDP) from the deployment platform;
decouple the received MDP into at least one of a function model, a sorting criteria model, and an algorithm model to obtain at least one of a decoupled function model, a decoupled sorting criteria model, and a decoupled algorithm model; and
store at least one of the decoupled function model, the decoupled sorting criteria model, and the decoupled algorithm model into the associated model repositories.

9. The device according to claim 1, wherein the programming instructions are for execution by the at least one processor to:
receive an extension request from an extension owner, wherein the extension request comprises a request for an aggregation platform extension data model (APEDM);
determine an APEDM based on the extension request; and
transmit the determined APEDM to the extension owner.

10. The device according to claim 9, wherein the programming instructions are for execution by the at least one processor to:
receive at least one model extension (ME) from the extension owner, wherein the ME comprises at least one model identifier and at least one associated model repository identifier; and
extend the APDM based on the received ME to obtain an extended aggregation platform data model (EAPDM).

11. A device for a communication system, comprising:
at least one processor; and
one or more memories coupled to the at least one processor and storing programming instructions for execution by the at least one processor to:
transmit a request to a second device, wherein the transmitted request comprises a request for an aggregation platform data model (APDM);
receive the APDM from the second device in response to the transmission of the request, wherein the received APDM comprises at least one relationship between at least one model and at least one associated model repository, wherein the at least one model is stored in the at least one associated model repository and described by the APDM;

in response to receiving the APDM from the second device, generate an aggregation requirement (AR) including a plurality of tasks based on the received APDM, wherein the generated AR comprises at least one a model identifier and at least one associated model repository identifier; and transmit the generated AR to the second device.

12. The device according to claim 11, wherein the programming instructions are for execution by the at least one processor to:

receive an operator requirement (OR) from an operator, wherein the OR comprises at least one service requirement;

map the received OR onto the received APDM to obtain an intermediate data model; and generate the AR based on the intermediate data model.

13. The device according to claim 11, wherein the programming instructions are for execution by the at least one processor to:

receive an extended aggregation platform data model (EAPDM) from the second device;

generate an extended aggregation requirement (EAR) based on the received EAPDM; and transmit the generated EAR to the second device.

14. The device according to claim 13, wherein the programming instructions are for execution by the at least one processor to:

transmit a deployment template decupling request (DTDR) to a deployment platform, wherein the transmitted DTDR comprises at least one deployment platform identifier.

15. A method, comprising:

receiving a request from a device, wherein the received request comprises a request for an aggregation platform data model (APDM);

determining the APDM based on the received request, wherein the determined APDM comprises at least one relationship between at least one model and at least one associated model repository, wherein the at least one model is stored in the at least one associated model repository and described by the APDM;

transmitting the determined APDM to the device;

after transmitting the determined APDM to the device, receiving an aggregation requirement (AR) including a plurality of tasks from the device, wherein the received AR comprises at least one model identifier and at least one associated model repository identifier; and executing the AR to generate a deployment template (DP), wherein the DP is used to deploy at least one service required by the device.

16. The method according to claim 15, wherein the model identifier of the received AR comprises a function model identifier, an algorithm model identifier, and a sorting criteria model identifier.

17. The method according to claim 15, wherein the associated model repository identifier of the received AR comprises a function model repository identifier, an algorithm model repository identifier, and a sorting criteria model repository identifier.

18. The method according to claim 17, further comprising:

matching the received model identifier and the associated model repository identifier of the AR to the model and to the associated model repository to obtain at least one matched model;

determining at least one function model and at least one sorting criteria model based on the at least one matched model;

sorting the determined function model based on the determined sorting criteria model to obtain a sorted function model; and applying at least one algorithm on the sorted function model based on the algorithm model repository identifier to generate the DP.

19. The method according to claim 15, wherein the determined APDM further comprises a description of the model, at least one attribute of the model, at least one description of the model repository, and at least one attribute of the model repository.

20. The method according to claim 15, further comprising transmitting the DP to a deployment platform.

* * * * *